(12) United States Patent
Aggarwal et al.

(10) Patent No.: US 9,258,112 B2
(45) Date of Patent: Feb. 9, 2016

(54) CONFIGURABLE KEY-BASED DATA SHUFFLING AND ENCRYPTION

(71) Applicant: Accenture Global Services Limited, Dublin (IE)

(72) Inventors: Vibhor Aggarwal, Karnataka (IN); Sanjoy Paul, Karnataka (IN); Annervaz Km, Kerala (IN); Amitabh Saxena, Bangalore (IN)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 316 days.

(21) Appl. No.: 13/839,545

(22) Filed: Mar. 15, 2013

(65) Prior Publication Data

US 2014/0270164 A1 Sep. 18, 2014

(51) Int. Cl.
*H04L 9/08* (2006.01)
(52) U.S. Cl.
CPC ............ *H04L 9/0816* (2013.01); *H04L 9/0894* (2013.01)
(58) Field of Classification Search
CPC ............................ H04L 9/0816; H04L 9/0894
See application file for complete search history.

(56) References Cited

U.S. PATENT DOCUMENTS

| 2011/0202764 | A1 | 8/2011 | Furukawa |
| 2011/0270837 | A1 | 11/2011 | Raj et al. |
| 2013/0246877 | A1* | 9/2013 | Zhang et al. ................. 714/752 |
| 2013/0305114 | A1* | 11/2013 | Olcay et al. ................... 714/755 |
| 2014/0164866 | A1* | 6/2014 | Bolotov et al. ............... 714/758 |
| 2014/0237314 | A1* | 8/2014 | Yang et al. .................... 714/752 |

OTHER PUBLICATIONS

Syam Kumer P et al: "Ensuring data storage security in cloud computing using Sobol Sequence", Parallel Distributed and Grid Computing (PDGC), 2010 1st International Conference on, IEEE, Piscataway, NJ, USA, Oct. 28, 2010, pp. 217-222.

Shiyuan Wang et al: "A Comprehensive Framework for Secure Query Processing on Relational Data in the Cloud", Sep. 2, 2011, Secure Data Management, Springer Berlin Heidelberg, Berlin, Heidelberg, pp. 52-69.

"The extended European search report" for European Patent Application No. 14000923.4 dated Jul. 25, 2014, European Patent Office, 8 pages.

* cited by examiner

*Primary Examiner* — Joseph P Hirl
*Assistant Examiner* — Thomas Gyorfi
(74) *Attorney, Agent, or Firm* — Mannava & Kang, P.C.

(57) ABSTRACT

A data shuffling and encryption system may include data storage to store a key and a coding module to shuffle and encrypt an input data sequence. The shuffling and encrypting may include determining an n-dimensional space and populating the n-dimensional space with the input data sequence. A quasi-random function may be applied to sample the n-dimensional space, and samples may be used as an index into the n-dimensional space to determine an output data sequence from the n-dimensional space.

20 Claims, 11 Drawing Sheets

Example of De-Shuffling and Decryption Process

- Input: shuffled data and dimensions (4,2)

| 1 | 7 | 4 | 6 | 2 | 8 | 3 | 5 |
|---|---|---|---|---|---|---|---| output data sequence 210

- Sample this (4,2)-dimensional space using a quasi-random sequence and the generated samples to figure the indexes of each of the input elements.

{1,1}

{1,1}, {3,2}

{1,1}, {3,2}, {4,1}

...

{1,1}, {3,2}, {4,1}, {2,2}, {2,1}, {4,2}, {3,1}, {1,2}

- Linearize the (4,2)-dimensional space to get the deshuffled sequence

{1,2,3,4,5,6,7,8}
input data sequence 201

*FIG. 3*

Example of De-Shuffling and Decryption Process With Padding

- Input: shuffled data and dimensions (3,3)

| 1 | 5 | 3 | 7 | 4 | 8 | 2 | 6 | output data sequence 310

- Perform Quasi-random sampling to get samples 309. Map values of output data sequence 310 to 3x3 dimensional space 301 according to samples 309 to populate 3x3 dimensional space 301

{1,1}

{1,1}, {3,3}*

{1,1},{3,3}*,{4,2}*,{2,4}*,{2,2}
* These indices are skipped

CONFIGURABLE KEY-BASED DATA SHUFFLING AND ENCRYPTION

BACKGROUND

Data security is becoming vital especially given the increasing willingness of individuals to provide their confidential information to other parties and the growing popularity of shared data storage, such as on cloud computing systems. For example, it is not uncommon for a person to allow an online retailer to store their credit card information or agree to allow a social media site to use their information for marketing or other reasons. To protect the individual, it is not uncommon to anonymize the data and store the data in secure data storage.

BRIEF DESCRIPTION OF DRAWINGS

The embodiments are described in detail in the following description with reference to examples shown in the following figures.

FIG. 3 illustrates an example of a process for data shuffling and encryption.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

According to an embodiment, a data shuffling and encryption system uses multi-dimensional quasi-random sampling for key-based data shuffling to generate an encrypted and shuffled output data sequence. Two nearby elements in an input data sequence provided to the data shuffling and encryption system may be far apart in the generated permutation that is output from the data shuffling and encryption system as a data sequence. The data shuffling and encryption system can dynamically configure parameters to provide a degree of anonymity and security based on user requirements.

The data shuffling and encryption system simultaneously shuffles and encrypts input data. Encryption for example is a process of encoding information in such a way that the information cannot be understood unless it can be decrypted for example with the required function and/or data, such as a key. Shuffling may include shuffling elements in an input data sequence so they are in a different order. According to an embodiment, consecutive elements in an input data sequence are shuffled so they are not next to each other in the output data sequence and are encrypted because the input data sequence cannot be determined from viewing the shuffled output data sequence. The data shuffling and encryption described herein is generally referred to as a shuffling and encryption process because it achieves both shuffling and encryption of an input data sequence. However, the shuffling and encryption process performed according to one or more embodiments described herein is a single process that achieves both shuffling and encryption. Similarly, de-shuffling and decryption is a single process that achieves both de-shuffling and decryption. Also, the data shuffling and encryption can shuffle and encrypt the whole input sequence or split it into chunks which can be individually permuted and encrypted.

The shuffling and encryption may be key-based. The key size may be independent of the length of the input sequence.

The data shuffling and encryption system can provide data security and anonymity for a variety of applications. For example, the system may be used for data storage, archiving or any application whereby privacy and security of data is desired.

Figure 1A:
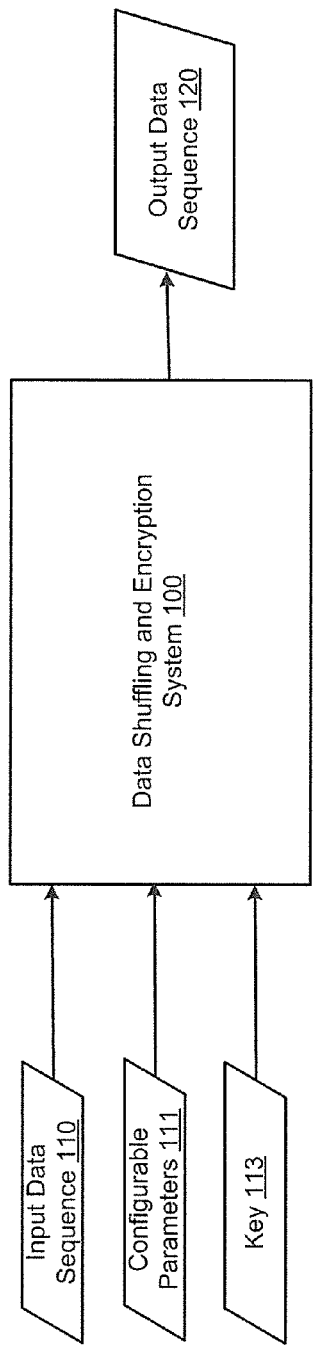
FIGS. 1A-B illustrates an example of a data shuffling and encryption system.
Figure 1B:
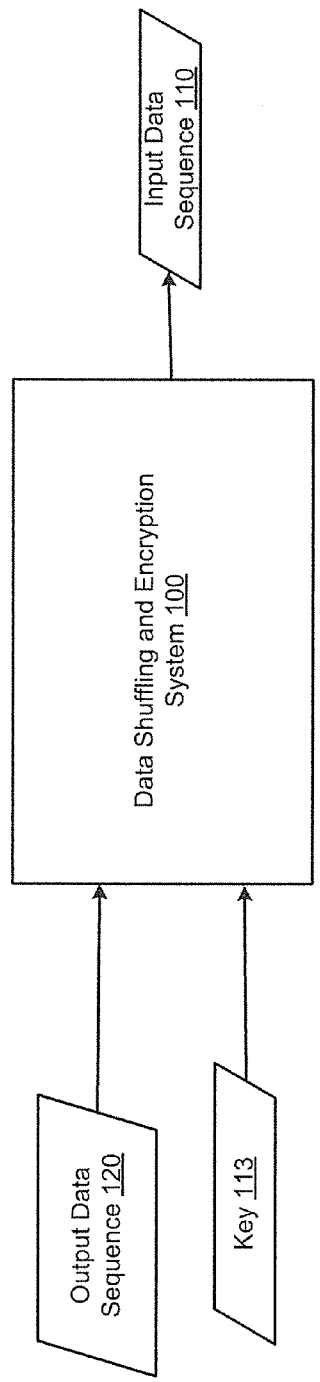

FIGS. 1A-B show a data shuffling and encryption system 100 that may be used for data shuffling and encryption and also for decryption and reverse shuffling referred to as de-shuffling. For example, FIG. 1A shows an input data sequence 110 which may be encrypted and shuffled by the data shuffling and encryption system 100 to generate the output data sequence 120 which is both encrypted and shuffled. Configurable parameters 111 may be provided to the data shuffling and encryption system 100 to set the level of anonymity and security of the encrypted sequence 120. FIG. 1B shows that the output data sequence may be decrypted and de-shuffled by the data shuffling and encryption system 100 to recreate the input data sequence 110. A key 113 is used for the encryption and decryption processes as further described below. The key 113 for example is any information used to encrypt and shuffle the input data sequence 110 and which is also needed to decrypt and de-shuffle the output data sequence 120.

Figure 1C:
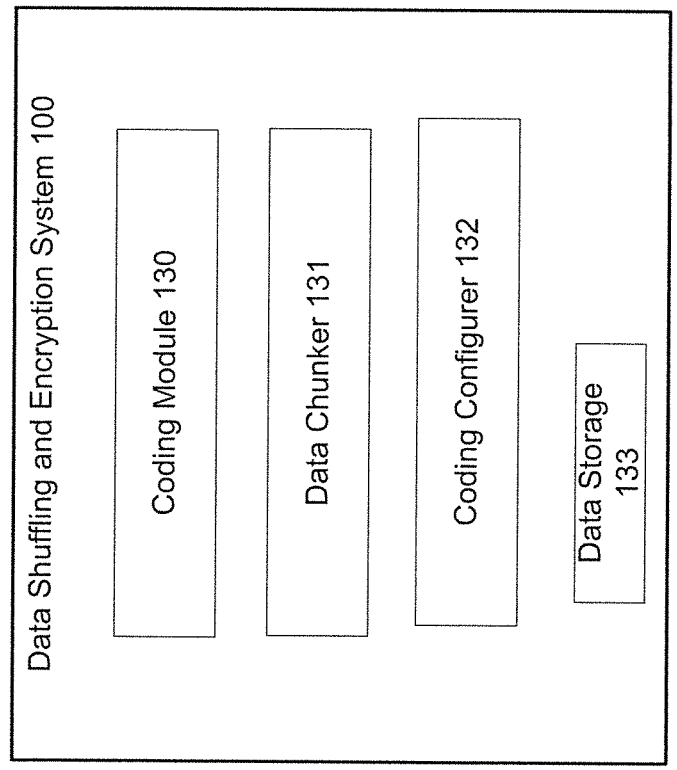
FIG. 1C illustrates an example of a block diagram of a data shuffling and encryption system.

FIG. 1C shows a block diagram of the data shuffling and encryption system 100. For example, coding module 130 may perform the shuffling/de-shuffling and encryption/decryption as further described below according to the processes and methods described below. The data chunker 131 may segment the input data sequence 110 into chunks for encryption and shuffling. The coding configurer 132 implements the configurable parameters 111 to set the level of anonymity and security for the encryption and shuffling. The data storage 133 may store information for the coding processes, such as the configurable parameters 111 and the key 113 and any other information that may be needed for the shuffling and encryption and the de-shuffling and decryption. The data storage 133 may comprise nonvolatile storage and may be secured to prevent unauthorized access to a key. The components of the data shuffling and encryption system 100 may include hardware, software or a combination of hardware and software.

Figure 1D:
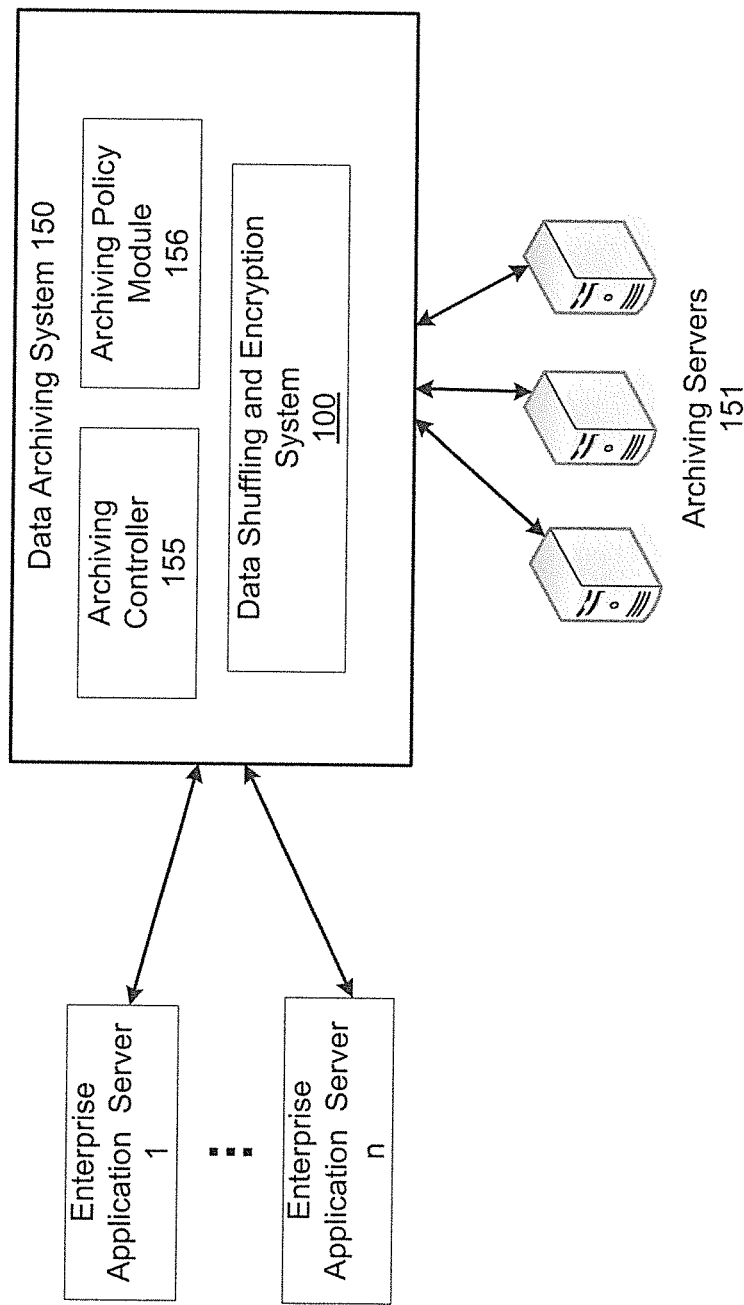
FIG. 1D illustrates an example of the data shuffling and encryption system in a data archiving system.

FIG. 1D shows an embodiment of using the data shuffling and encryption system 100 in a data archiving system 150. For example, the data archiving system 150 receives data from the enterprise application servers 1-n which may execute enterprise applications generating data which may need to be archived. The data archiving system 150 archives the data on the archiving servers 151. The data archiving system 150 may include an archiving controller 155 and an archiving policy module 156. The archiving policy module 156 implements policies for archiving. The policies may indicate what data needs to be archived and/or the policies may indicate what data needs to be encrypted and shuffled by the data shuffling and encryption system 100 before it is archived. If the data is to be shuffled and encrypted, the archiving controller 155 sends the data to the data shuffling and encryption system 100 and then the shuffled and encrypted data is archived in the archiving servers 151. Archiving may include storing the data or a version of the data in the archiving servers. The archiving controller 155 may also be responsible for restoring archived data as well as the archiving. If data is to be restored, it is retrieved from the archiving server that is storing it, and then may be decrypted and de-shuffled by the data shuffling and encryption system 100 and sent to the enterprise application server to which the data is being restored. In one embodiment, the data shuffling and encryption system 100 may be provided in one or more of the enterprise application servers 1-n so the data may be encrypted and shuffled before it is sent to the data archiving system 150.

Figure 2:
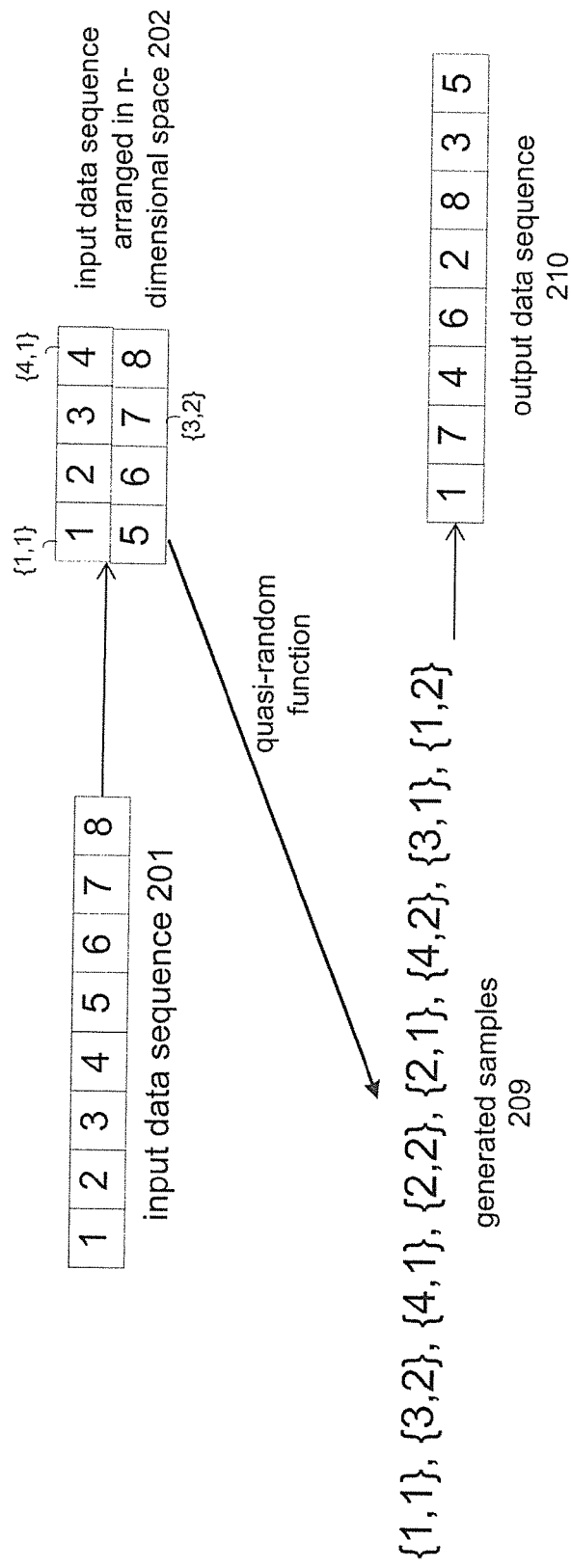
FIG. 2 illustrates an example of a process for data shuffling and encryption.

FIG. 2 shows an example of encrypting and shuffling an input data sequence that may be performed by the data shuffling and encryption system 100. The input data sequence 201 shown in FIG. 2 is an example of the input data sequence 110 of FIG. 1. In the example in FIG. 2, the input data sequence 201 includes elements 1-8 in numerical order. For example, element 1 is integer 1, element 2 is integer 2, etc. The elements in an input data sequence may include other types of data, such as strings, floating points, binary data, database records, etc.

The input data sequence is arranged in an n-dimensional space 202, whereby n>0. Each dimension in the n-dimensional space may have the same length or different lengths. The dimension lengths can be a power of 2 (e.g., $2^x$). In this example, n is 4 by 2, e.g., 4×2. 2 is the number of rows and 4 is the number of columns. The value of n for example is the key, such as key 113 shown in FIGS. 1A-B. The value of n for example is the dimension lengths, such as 4×2.

The input data sequence is arranged into the n-dimensional space 202 and a quasi-random sampling on the n-dimensional space is performed to determine quasi-random samples 209. For example, the coding module 130 shown in FIG. 1D may include a quasi-random function that can generate a quasi-random sequence from the key which is 4×2 in this example to generate the samples 209. The generated samples 209 embody the shuffling provided by the coding module 130.

One example of a quasi-random function is the van der Corput function which generates a van der Corput sequence. A van der Corput sequence in base-b is generated by reversing the digits of natural numbers when represented in the base b, where b>=2. The van der Corput function was first published in 1935 by the Dutch mathematician J. G. van der Corput. Other quasi-random functions may be used. For example, a quasi-random function determined by J. H. Halton may be used. For example, a quasi-random Halton sequence may be generated by selecting a base, such as base 2. Each element in the input data sequence is converted to base 2, and the elements are reversed (e.g., 1.0 is reversed to 0.1), and converted back to base 10. Other examples of quasi-random functions are functions that generate a Sobol sequence or a Niederreiter sequence.

Generating the indices according to the quasi-random sequences is now further described. For example, a quasi-random generator implementing a quasi-random function, such as one of the functions described above, takes an index(i) and the number of dimensions(d) and outputs the ith element in the quasi-random sequence. This element is a d-dimensional tuple with values usually between 0 and 1 for each dimension. Assume the input to the quasi-random generator is an n-dimensional space containing a total of m elements. The generator is called m times, while feeding i=0 to m−1 and d=n to generate m n-dimensional tuples. Then the output values (a number between 0 and 1) is scaled to find the exact index. For example, a quasi-random output of {0.25, 0.5, 0.125} in a 3-dimensional space with lengths {4, 32, 16} is transformed into the index {1, 16, 2}, i.e., {0.25*4, 0.5*32, 0.125*16}. The generator always generates the same output values given an index i and dimension d, assuming other parameters are held constant. Other parameters consists of things like type of quasi-random generator, such as Sobol, Halton, or Niederreiter, and the base employed for calculation, e.g., base 2, base 3, etc. Some quasi-random sequences can take more parameters as well for the generation of the sequences. In one example, Sobol or Niederreiter sequences are used in base 2.

A property of these quasi-random functions for sampling the n-dimensional space is that from the key, the samples 209 are generated. Thus, if the key is known, which is 4×2 in this example, the same samples 209 can be generated every time using the same quasi-random function and the same key. Thus, the key and the quasi-random function are used to generate the samples 209 for the shuffling and encryption process, and the same key and the same quasi-random function are used to generate the same samples 209 for the de-shuffling and decryption process.

In addition to the key 113, the type of quasi-random sequence used as well as its associated parameters may be stored in the data storage 133 and used for the decryption. For example, multiple quasi-random sequences exist, each with its own set of configurable parameters. For example, generation of a Sobol sequence is dependent upon direction numbers and a primitive polynomial. If you change these, the output sequence alters. Therefore, the type of quasi-random sequence used as well as its associated parameters can be stored for decryption and de-shuffling.

The generated samples 209 shown in FIG. 2 are used as a set of coordinates (also referred to as indices) for determining the elements for the output data sequence 210 from the n-dimensional space 202. For example, the coordinates are applied to the n-dimensional space 202 to determine the values to include in the output data sequence 210. For example, {1, 1} are x and y coordinates in the 2-dimensional space 202. The value at the coordinates {1, 1} is 1. The value at the coordinates {3, 2} is 7, and the other values for the output data sequence 210 are determined by this process from each of the samples 209. The output data sequence 210 may have no two elements of the input data sequence 201 together. The output data sequence 210 is shuffled and encrypted.

FIG. 3 shows an example of a de-shuffling and decrypting process that may be performed by the data shuffling and encryption system 100. One input to the data shuffling and encryption system 100 is the output data sequence 210 generated in FIG. 2 and shown again in FIG. 3. The other input is the key, which is 4×2 in this example, which are the dimension lengths of the n-dimensional space.

For decryption and de-shuffling, the quasi-random function implemented by the coding module 130 for the shuffling and encryption is also applied to the key to determine the samples 209. Each coordinate in the samples 209 is used to place the corresponding element from the output data sequence 210 in the n-dimensional space 202. For example, the first coordinate is {1, 1}. The first element of the output data sequence 210 is 1 and thus 1 is placed in the coordinate {1, 1} in the n-dimensional space 210. This process is repeated for each element of the output data sequence 210 such as shown in FIG. 3 to populate the n-dimensional space 202 with the elements of the output data sequence 210 at the corresponding coordinates. The populated n-dimensional space 202 is then linearized to generate the input data sequence 201. To linearize the populated n-dimensional space 202, the order the elements were originally placed in the n-dimensional space 202 is known from FIG. 2, and the reverse order may be used to determine the input data sequence 201 from the populated n-dimensional space 202 shown in FIG. 3.

To generate a much larger number of sequences, data can be arranged in dimensions of arbitrary lengths. However, in one embodiment the dimension lengths should be a power of 2 to ensure all indices are sampled by the quasi-random sequence only once.

Figure 4:
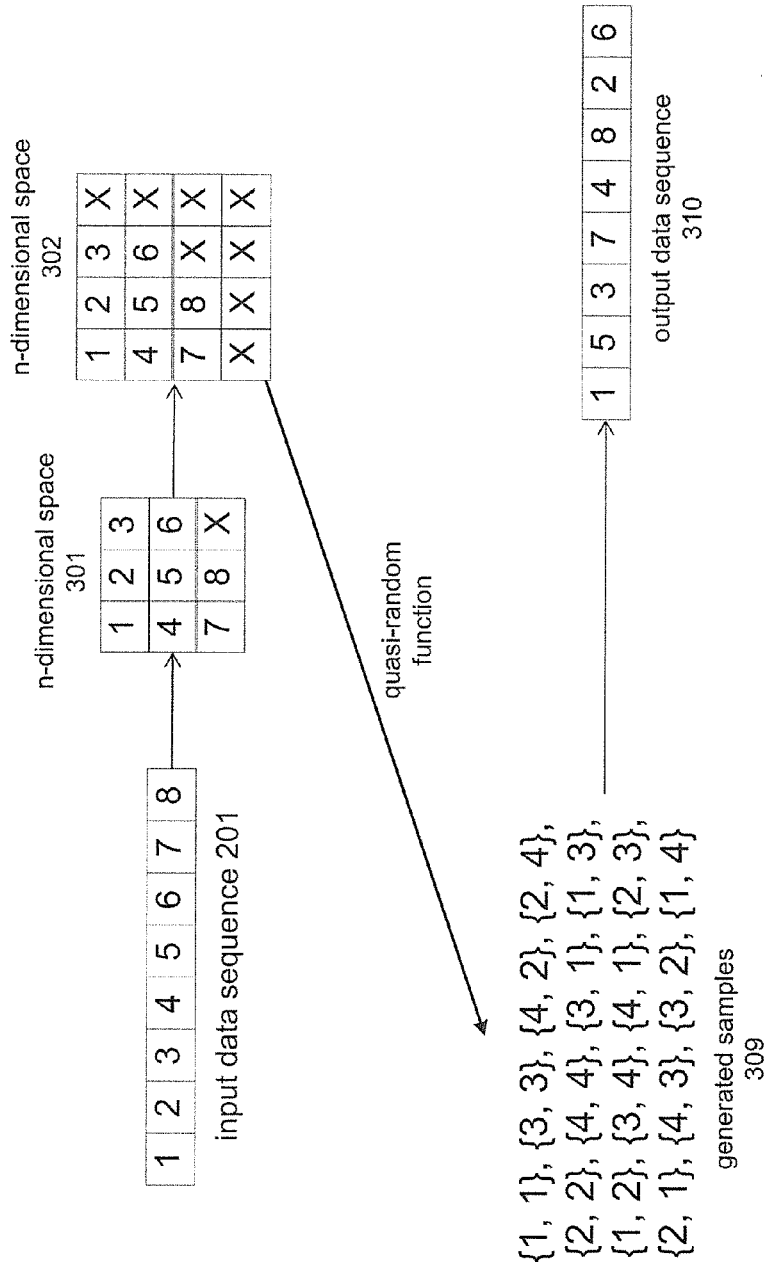
FIG. 4 illustrates an example of a process for data shuffling and encryption with padding.

FIG. 4 shows a padding example whereby the input data sequence 201 arranged in an n-dimensional space 301 having dimension lengths 3×3. The empty coordinates of the n-dimensional space 301 are populated with padding value, such as a default value, e.g., marked 'X'. The n-dimensional space 301 is converted to an n-dimensional space 302 having dimension lengths that are a power of 2, and the empty coordinates of the n-dimensional space 302 are populated with the padding value, which in this case is the bottom row and the last column.

Then, similar to as shown and described with respect to FIG. 2, the coding module 130 shown in FIG. 1D generates samples 309 by applying the quasi-random function to the key. The generated samples 309 embodies the shuffling. The generated samples 309 are used as a set of coordinates for determining the elements for the output data sequence 310 from the n-dimensional space 302. Thus, an n-dimensional space (e.g., 302) with dimension lengths that are a power of 2 just greater than the initially created n-dimensional space (e.g., 301) is sampled using the quasi-random sequence. For example, the n-dimensional space 302 is 4×4, where 4 is the next higher power of 2 from 3. Any power of 2 may be used. It does not need to be the next higher power of 2. For example, an 8×4 space may be used. Any positions marked 'X' are dropped in the output data sequence 310. For example, the coordinates of the samples 309 are applied row-by-row to the n-dimensional space 302 to determine the values for the output data sequence 310. However, any coordinates containing the padding value, shown as 'X', are not included in the output sequence. So, in the first row of the samples 309, values in the coordinates {3, 3}, {4, 2}, {2, 4} are not included. In the second row, {4, 4} is skipped. In the third row, {3, 4} and {4, 1} are skipped and in the fourth row, {4, 3} and {1, 4} are skipped.

For the skipping, 3×3 is outside the range of the input data sequence. For example, 3×3 means there are 9 elements but the input data sequence 201 only has 8 elements so 3×3 is skipped. 4×2 means that it is outside the 3×3 original dimensions. So if any of the dimensions are greater than 3 or it is more than the number of elements from the input data sequence 201, then skip it.

For the padding described above, the cells at the end are padded. However padding may be done at the front as well. For example, instead of putting X in the {3, 3} cell, X may be put in the {1, 1} cell and the rest of the elements may be filled with the input data. However, the information on how the padding has been done also needs to be stored in the key 113. In a general case, there are three attributes for each dimension of the n-dimensional space which are stored in the key 113 apart from the quasi-random generation information specified in the earlier point. First the length in which the data is stored; second, the length which is sampled (e.g., a power of 2); and third, how the padding is done in that dimension.

Furthermore, different patterns of padding values may be used to further secure the data, and the patterns are stored in the key 113 so the output data sequence can be de-shuffled and decrypted. For example, tables 1A-C show examples of patterns of padding values as follows:

TABLE 1A (8 × 2)

| X | 1 | X | X | 2 | 3 | X | 4 |
| X | 5 | X | X | 6 | 7 | X | 8 |

TABLE 1B (4 × 4)

| X | X | 1 | 2 |
| X | 3 | X | 4 |
| X | X | 5 | 6 |
| X | 7 | X | 8 |

TABLE 1C (4 × 4)

| X | X | X | X |
| X | X | X | X |
| 1 | 2 | 3 | 4 |
| 5 | 6 | 7 | 8 |

The tables 1A-C show an input data sequence of 1-8, and the padding value as X. The padding pattern can be as complex as desired. The pattern is stored as part of the key 113 so the pattern can be determined from the key 113 to determine the location of the padding values.

Figure 5:
FIG. 5 illustrates an example of a process for data de-shuffling and decryption with padding.
Figure 5:

FIG. 5 shows an example of the de-shuffling and decrypting process in the output data sequence 310 according to the padding example shown in FIG. 4. The output data sequence 310 is now the input to the coding module 130 to determine the samples 309. Then, to decrypt, the key, which is 3×3 in this example is used. 3×3 is the dimensions of the original n-dimensional space 301. Apply each coordinate in the samples 309 to each of the values in the output data sequence 310 in order to map the values of the output data sequence 310 to the 3×3 dimensional space 301. For example, {1, 1} is the first coordinate in the samples 309. {1, 1} is a coordinate in the 3×3 space, so the first value in the output data sequence 310, which is 1, is populated at {1, 1} in the 3×3 dimensional space 301. Coordinates may be dropped if they are not in the 3×3 dimensional space 301, such as coordinates {4, 2} and {2, 4} or if the coordinates correspond to a padding value, such as {3×3}, in the 3×3 dimensional space 301. So, as shown in FIG. 5, the next value from the output data sequence 310 to be placed in the 3×3 dimensional space 301 is 5, and the next coordinate in the samples 309 is {3, 3}. {3, 3} corresponds to a padding value of the 3×3 dimensional space 301 as previously determined according to the padding shown in FIG. 4 so the default value is placed at that coordinate rather than the 5. Thus, {3, 3} is skipped and then {4, 2} and {2, 4} are skipped because these coordinates are not in the 3×3 dimensional space 301. {2, 2} corresponds to a coordinate in the 3×3 dimensional space 301, so the 5 is placed at this coordinate. This process is repeated for the remaining values in the output data sequence 310 and for the remaining coordinates in the samples 309. Then, the populated 3×3 dimensional space 301 is linearized to determine the input data sequence 201.

Instead of encrypting and shuffling the entire sequence at one time, the encrypting and shuffling may be performed on chunks of the input sequence and then concatenated to form the output data sequence.

For example, assume the input data sequence is 1-64. The data chunker 131 may split the input data sequence into 8 chunks, e.g., chunks C0-C7. For example, C0 has values 1-8, C1 has values 9-16, etc. Each chunk is separately shuffled and encrypted such as described in the shuffling and encrypting processes described above to determine an output data sequence for each chunk. The output data sequences for the chunks may be concatenated for example in order of C0-C7 to determine an output data sequence. The data storage 133 can store information for the chunking such as size of each chunk and the number of chunks for example as part of the key 113, which is used for de-shuffling and decryption. The size of each chunk may vary. The number and size of each chunk may be determined based on the configurable parameters 111, such as a security parameter and an anonymity parameter as describe below.

The system 100 may perform multi-level chunking. For example, at a first chunking level in 2-level chunking, C0-C7 are first shuffled and encrypted. An example of the output data sequence may be C3, C7, C0, C2, C6, C4, C1, C5. Then, at a second chunking level, each chunk may be shuffled and encrypted. To de-shuffle and decrypt, first the output data sequence is de-shuffled and decrypted to get the sequence C0-C7 from the sequence C3, C7, C0, C2, C6, C4, C1, C5 and then each chunk is de-shuffled and decrypted. The chunking and shuffling described here can be performed multiple times on the input data for multi-level chunking.

The number and size of each chunk may be determined based on the configurable parameters 111, such as a security parameter and an anonymity parameter. Suppose the input data sequence is n bytes long. The total number of permutations that can be generated for the output data sequence is n! assuming there are no constraints. A permutation is a shuffling of the input data, so the number of shuffled sequences that can be generated is n!. Suppose under a particular shuffling scheme which may use chunking, X out of n! permutations are possible to get generated. The number of permutations X may be less than n! also because of constraints, such as that no two values of the input data sequence can be next to each other or that the input values must be a certain distance apart. The security parameter for example is defined as $d=X/n!$. The value of d may be a user input.

Another parameter is the anonymity parameter. Suppose the input data sequence is n bytes long. The total number of permutations possible if we use quasi-random shuffling without any splitting is $2^{(r-1)}$ where $2^r=n$. Suppose under a particular shuffling scheme using chunking and combining, X out of all n! permutations are possible to get generated. The anonymity parameter for example is defined as $(2^{(r-1)})/X$.

The security parameter is $X/n!$ and the anonymity parameter is $(2^{(r-1)})/X$, where X is the total number of permutations possible in the quasi-random shuffling and encryption process and $2^r=n$. The value of the security parameter is between $(2^{(r-1)})/n!$ and 1. The lowest security case is when typical quasi-random shuffling without any chunking is used. The highest security case is when chunking is used and n! shufflings are possible. The actual possibility of this depends on the underlying quasi-random function used and may not be realizable.

Figure 9:
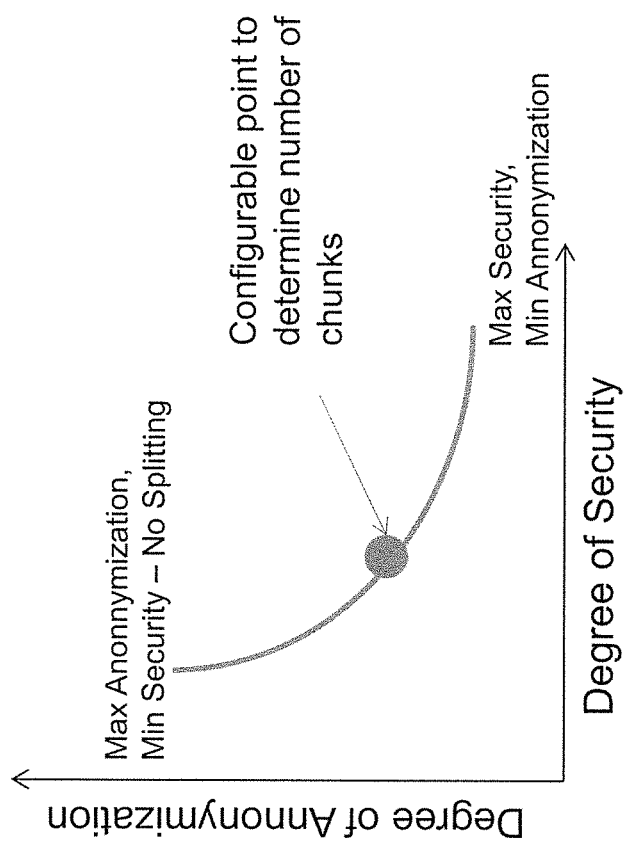
FIG. 9 shows an example of a graph illustrating an inverse relationship between configurable parameters.

The value of the anonymity parameter is also between $(2^{(r-1)})/n!$ and 1. The lowest case is when chunking is used, where all of n! shufflings are possible. The highest case is when a typical quasi-random function is used without any chunking. There is an inverse relationship between security and anonymity so the values of the anonymity and security parameters may be selected to balance between security and anonymity. FIG. 9 shows a graph illustrating the inverse relationship between the parameters and a point may be selected on the graph to balance between security and anonymity and to determine the number of chunks.

Different industry domains (e.g., finance, healthcare, media, etc.) may have different requirements for privacy and/or confidentiality. Default parameters can be stored and used for those domains. Applications within a given domain could also have different requirements and hence could play a role in determining the parameters as well. Furthermore, different parameters may be used for different services or business relationships. For example, a service provider may provide more confidentiality or more anonymity for platinum customers versus gold and silver customers.

Figure 6:
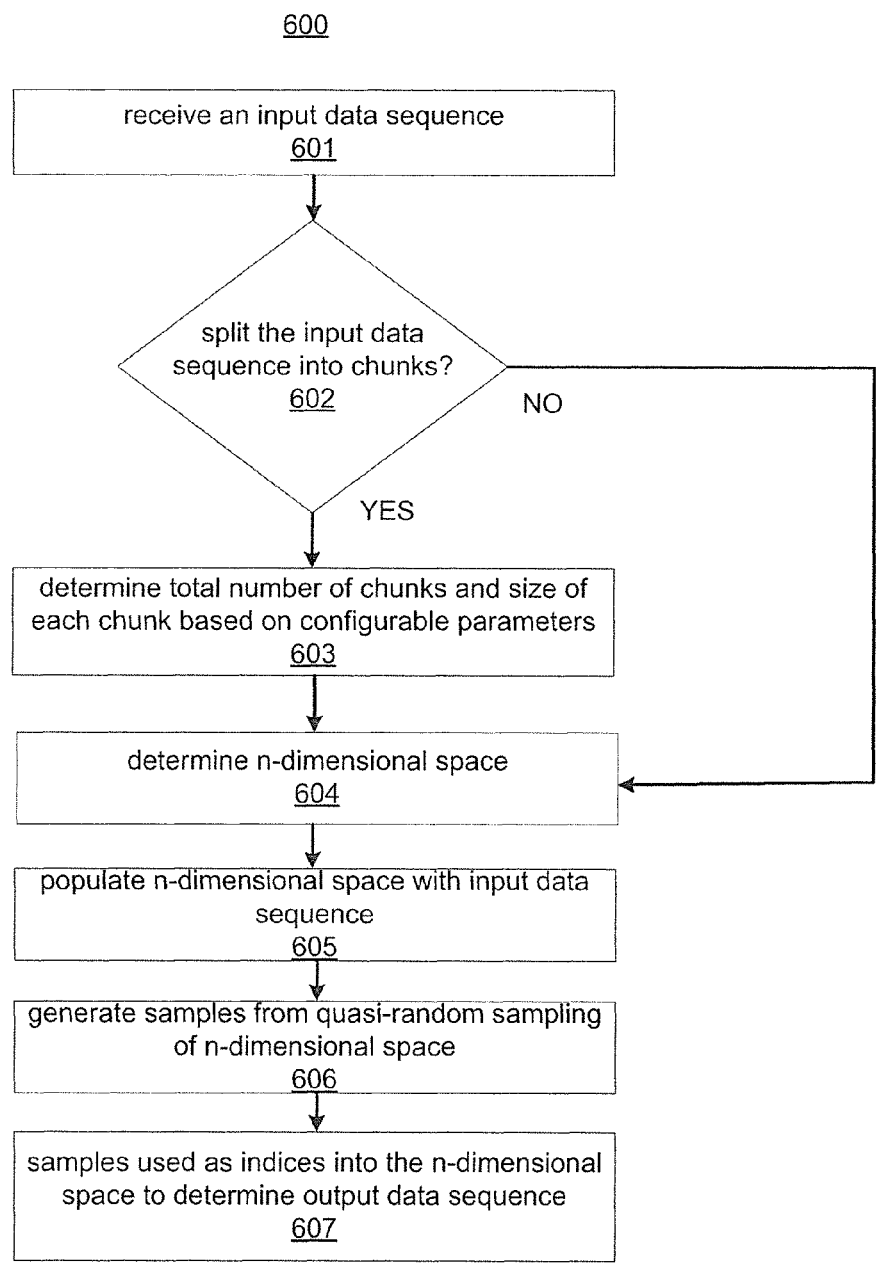
FIG. 6 illustrates an example of method for data shuffling and encryption.
Figure 7:
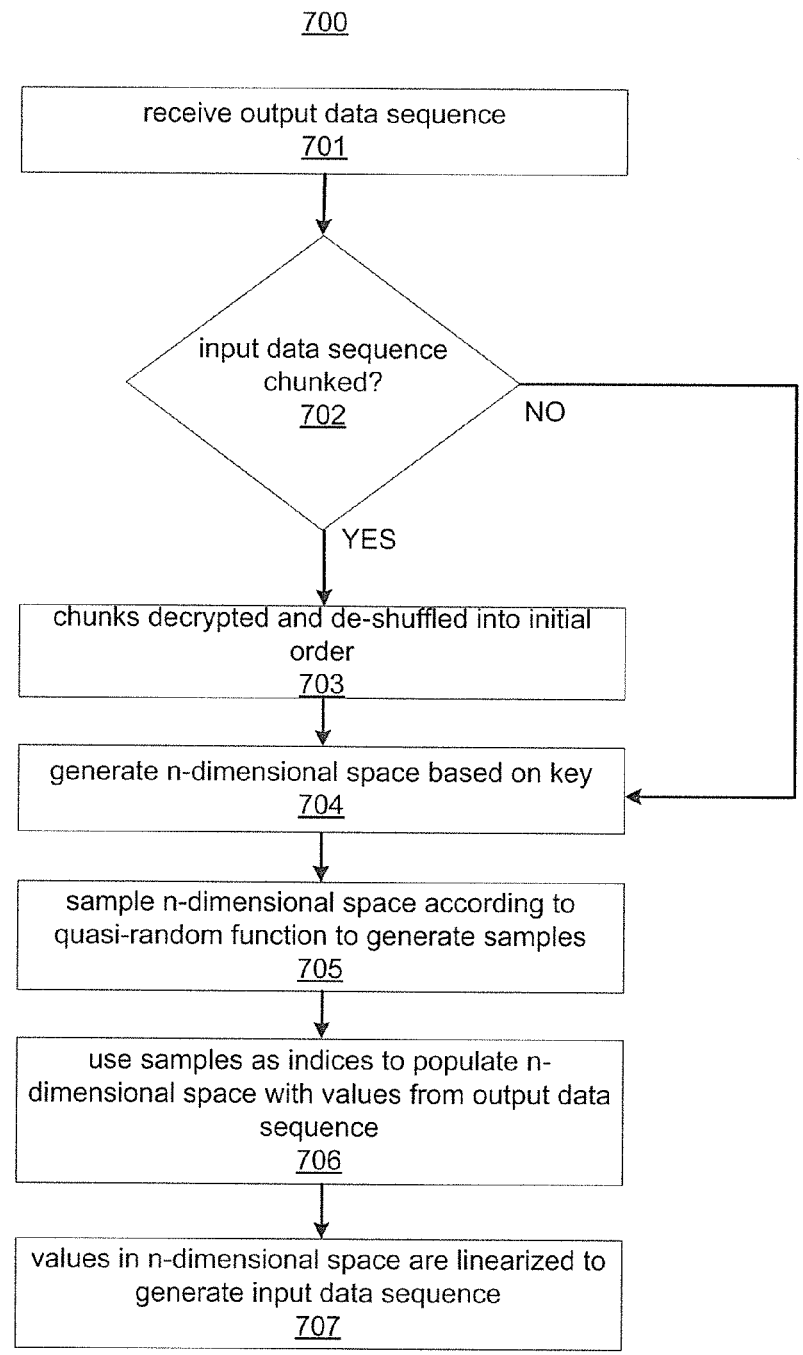
FIG. 7 illustrates an example of a method for data de-shuffling and decryption with padding.

As shown in FIG. 10, the data shuffling and encryption system 100 may include a coding module 130. The coding module 130 for example performs coding which includes shuffling and encryption and de-shuffling and decryption as described herein. FIG. 6 illustrates a method 600 according to an embodiment for coding including shuffling and encryption. FIG. 7 illustrates a method 700 according to an embodiment for coding including de-shuffling and decryption. The methods 600 and 700 may be performed by the system 100 including the coding module 130 by way of example. The methods may be performed by other systems.

At 601 of the method 600, the system 100 receives an input data sequence. An input data sequence may include a sequence of values such as shown in the input data sequence 201. The input data sequence may be a sequence of bytes representing values.

At 602, the system 100 determines whether to split the input data sequence into chunks. For example, the coding configurer 132 may receive one or more configurable parameters 113 from a user or another system. The configurable parameters 113 may include a security parameter and/or an anonymity parameter such as described above. The security parameter may be $d=X/n!$ as described above. The anonymity parameter may be $a=(2^{(r-1)})/X$ as described above. A total number of chunks and a size of each chunk may be determined from the configurable parameters 113 at 603 for splitting the input data sequence into chunks.

At 604, an n-dimensional space is determined. The value of n is stored as part of the key 113. For example if n is 2×2, then 2×2 is stored in the key 113. n may be determined at random or based on other parameters. The length of each dimension should be a power of 2. If not, a new dimensional space is determined wherein a length may be changed to a higher power of 2. For example, if a 3×3 space is changed to a 4×4 space with padding as shown in FIGS. 4 and 5. The key and the number of chunks and each chunk size, which may be the same or different for each chunk, may be stored in the data storage 133. Also, padding may be performed at 604 such as described above. Empty cells in an n-dimensional space may be padded. In one example, such as described in FIG. 4, an n-dimensional space is converted to an n-dimensional space having dimension lengths that are a power of 2 and padding values are added to empty cells. Padding values may be added in patterns such as described above. Three attributes may be stored for the key 113 for each dimension of the n-dimensional space, such as the length in which the data is stored, the length which is sampled (e.g., a power of 2), and how the padding done in that dimension.

At 605, the n-dimensional space is populated with the values of the input data sequence, for example as shown in FIGS. 2 and 4. If the input data sequence is split into chunks, then values for each chunk are populated into their own n-dimensional space.

At 606, a quasi-random function is applied to the populated n-dimensional space to generate samples from the quasi-random sampling of the n-dimensional space. All the parameters specifying the quasi-random sampling are stored as part of the key 113. If the input data sequence is split into chunks, the quasi-random function is applied to the populated n-dimensional space for each chunk.

At 607, the samples are used as indices into the n-dimensional space to determine the output data sequence. For example, as shown in FIGS. 2 and 4, the samples are coordinates, and the values at the coordinates in the n-dimensional space form the output data sequence. If the input data sequence was chunked, an output data sequence may be determined for each chunk and the output data sequences for the chunks may be concatenated to determine a final output data sequence.

The output data sequence may satisfy the constraint that no two elements from the input data sequence are next to each other in the output data sequence. Also, multi-level shuffling and encryption may be performed at 604.

For example, assume 2-level shuffling is to be performed. Chunks may be shuffled and encrypted at the chunk level. For example, start with 8 chunks C0-C7. C0, C1 ... C7 is the input data sequence. The chunks are shuffled and encrypted through the process described above to get an output data sequence, such as C3, C7, C0, C2, C6, C4, C1, C5. Then, shuffling can be done within each chunk. Any number of levels of shuffling may be performed.

FIG. 7 illustrates the method 700 for coding including de-shuffling and decryption. At 701, the output data sequence is received to de-shuffle and decrypt it to generate the input data sequence. The key is also determined, such as retrieved from storage. If the input data sequence was chunked, the number of chunks and size of each chunk is also determined, such as retrieved from storage.

At 702, a determination is made as to whether the input data sequence was split into chunks and shuffled and encrypted, such as described above with respect to multi-level shuffling. If it was, then the chunks are decrypted and de-shuffled so they are in the correct order at 703. For example, as described above, the input data sequence may include chunks C0-C7 that were shuffled to a different order, such as C3, C7, C0, C2, C6, C4, C1, C5 through the shuffling and encryption process. At 703, the chunks are de-shuffled and decrypted to their initial order of C0-C7 based on information in the key at 703.

At 704, the n-dimensional space is generated based on the key. For example, the key indicates the length for each dimension, such as 2×2 or 3×3. The n-dimensional space is generated for each chunk if the input data sequence was chunked. At 705, the n-dimensional space is sampled according to the quasi-random function using the quasi-random function attributes from the key to generate the samples, such as the samples 209 or 309 shown in FIGS. 3 and 5. If the input data sequence was chunked, then samples are generated for each chunk.

At 706, the output data sequence is transformed to the input data sequence for example by using the samples as indices to populate the n-dimensional space with values from the output data sequence such as shown in FIGS. 3 and 5. If the input data sequence was chunked, then values from each chunk are populated to their corresponding n-dimensional space and their corresponding samples. The information in the key may indicate if padding was done for the encryption and shuffling. If padding was done, then the padded value locations are determined from the key so the values from the output data sequence are populated into the correct cells in the n-dimensional space such as described in FIG. 5.

At 707, the values in the populated n-dimensional space are linearized to generate the input data sequence. If the input data sequence was split into chunks then the output data sequence for each chunk is transformed to the input data sequence and may be concatenated to form the input data sequence. If multi-level chunking and shuffling and encryption were performed, then first the output data sequence, e.g., C3, C7, C0, C2, C6, C4, C1, C5, is de-shuffled and decrypted such as described at 702 and 703 to C0-C7, and then each chunk C0-C7 may be de-shuffled and decrypted to determine the input data sequence such as described at 704-707. The steps of de-shuffling and decrypting the chunks into the initial order C0-C7 at 702 and 703 are not described above but may be similar to the steps described at 704-707.

Figure 8:
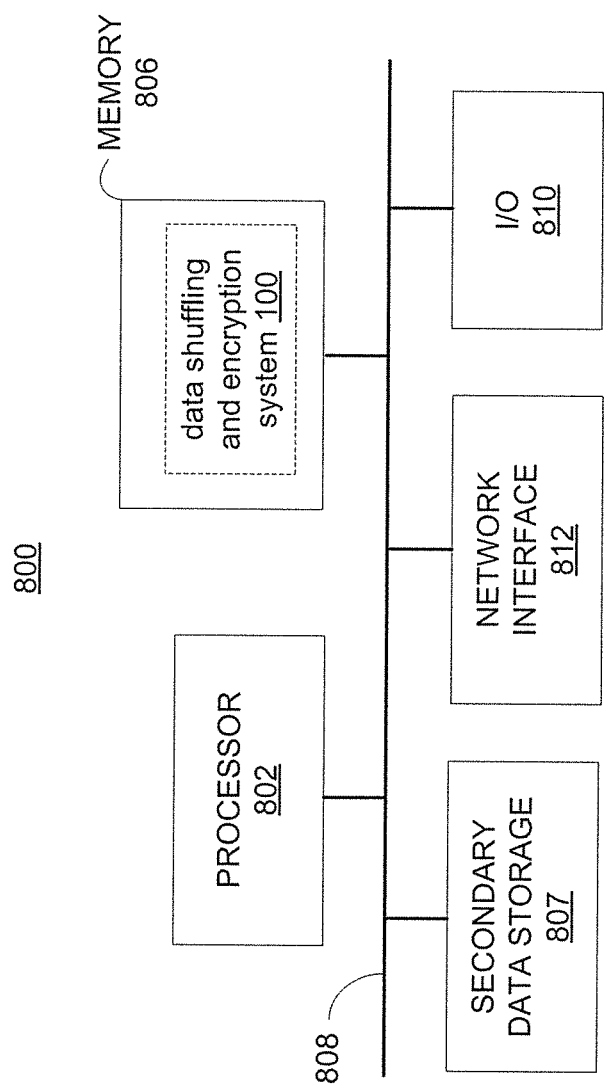
FIG. 8 illustrates an example of a computer system that may be used for the methods and systems.

FIG. 8 shows a computer system 800 that may be used with the embodiments and examples described herein. The computer system 800 includes components that may be in a server or another computer system. The computer system 800 may execute, by one or more processors or other hardware processing circuits, the methods, functions and other processes described herein. These methods, functions and other processes may be embodied as machine readable instructions stored on computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 800 includes at least one processor 802 that may implement or execute machine readable instructions performing some or all of the methods, functions and other processes described herein. Commands and data from the processor 802 are communicated over a communication bus 808. The computer system 800 also includes a main memory 806, such as a random access memory (RAM), where the machine readable instructions and data for the processor 802 may reside during runtime, and secondary data storage 807, which may be non-volatile and stores machine readable instructions and data. For example, machine readable instructions for the data shuffling and encryption system 100 may reside in the memory 806 during runtime. The memory 806 and secondary data storage 807 are examples of computer readable mediums.

The computer system 800 may include an I/O device 810, such as a keyboard, a mouse, a display, etc. For example, the I/O device 810 includes a display to display drill down views and other information described herein. The computer system 800 may include a network interface 812 for connecting to a network. Other known electronic components may be added or substituted in the computer system 800. Also, the data shuffling and encryption system 100 may be implemented in a distributed computing environment, such as a cloud system.

While the embodiments have been described with reference to examples, various modifications to the described embodiments may be made without departing from the scope of the claimed embodiments.

What is claimed is:

1. A data shuffling and encryption system comprising:
    a processor;
    a data storage to store a key; and
    a non-transitory computer readable storage medium storing instructions to be executed by the processor to cause the processor to:
    shuffle and encrypt an input data sequence, wherein the input data sequence is received from a server; and
    transmit the shuffled and encrypted data to another server, wherein the shuffling and encrypting includes:
        determining an n-dimensional space based on the key, wherein n>0, and the key indicates a size of the n-dimensional space;
        populating the n-dimensional space with data from the input data sequence in a sequence order that the data appears in the input data sequence;
        applying a quasi-random function to sample the data populated in the n-dimensional space to transform the data in the n-dimensional space into a sequence of quasi-random samples, wherein each quasi-random sample includes a coordinate corresponding to a position of the sampled data in the n-dimensional space;
        using the coordinates included in the quasi-random samples as an index into the n-dimensional space to obtain the data from the n-dimensional space; and
        placing the data obtained from the n-dimensional space in an order of the sequence of the quasi-random samples to generate an output data sequence.

2. The data shuffling and encryption system of claim 1, wherein the instructions further cause the processor to:
    segment the input data sequence into chunks; and
    shuffle and encrypt each of the chunks to determine an output data sequence for each chunk, and concatenate the output data sequences for the chunks to generate the output data sequence.

3. The data shuffling and encryption system of claim 2, wherein the instructions further cause the processor to:
    determine a number of the chunks and a size of each chunk based on at least one of a security parameter and an anonymity parameter.

4. The data shuffling and encryption system of claim 3, wherein at least one of the security parameter and the anonymity parameter is received as a user input, and at least one of the security parameter and the anonymity parameter is determined based on a total number of desired permutations of the concatenated output data sequence.

5. The data shuffling and encryption system of claim 1, wherein the instructions further cause the processor to de-shuffle and decrypt the output data sequence based on the key.

6. The data shuffling and encryption system of claim 5, wherein the processor is to de-shuffle and decrypt the output data sequence by applying the quasi-random function to the key to determine the quasi-random samples, populating the n-dimensional space with values from the output data sequence based on the quasi-random samples, and linearizing the values in the n-dimensional space to determine the input data sequence.

7. The data shuffling an encryption system of claim 1, wherein to populate the n-dimensional space with the input data sequence, the processor is to include padded values in the n-dimensional space, and store information describing locations of the padded values in the n-dimensional values as part of the key.

8. The data shuffling and encryption system of claim 7, wherein the locations of the padded values are a pattern.

9. The data shuffling and encryption system of claim 7, wherein the processor is to de-shuffle and decrypt the output data sequence using the key by applying the quasi-random function to the key to determine the quasi-random samples, populating the n-dimensional space with values from the output data sequence based on the quasi-random samples, and linearizing the values in the n-dimensional space to determine the input data sequence,
    wherein to populate the n-dimensional space for the de-shuffling and the decrypting, the processor is to determine if any of the values populated in the n-dimensional space from the shuffling and the encrypting are padded values based on the information describing the locations of the padded values in the key, and
    if any of the values are padded values, skip the quasi-random samples corresponding to the padded values when performing the populating of the n-dimensional space during the de-shuffling and the decrypting.

10. The data shuffling an encryption system of claim 1, wherein the key includes information identifying a type of quasi-random sequence generated by the quasi-random function and associated parameters for the type of the quasi-random sequence.

11. A method of coding an input data sequence comprising:
    receiving an input data sequence from a server; and
    shuffling and encrypting the input data sequence, wherein the shuffling and encrypting includes:
        determining an n-dimensional space wherein n>0;
        populating the n-dimensional space with data from the input data sequence in a sequence order that the data appears in the input data sequence;
        applying, by a processor, a quasi-random function to sample the data populated in the n-dimensional space to transform the data in the n-dimensional space into a sequence of quasi-random samples, wherein each quasi-random sample includes a coordinate corresponding to a position of the sampled data in the n-dimensional space;
        using the coordinates included in the quasi-random samples as an index into the n-dimensional space to obtain the data from the n-dimensional space; and
        placing the data obtained from the n-dimensional space in an order of the sequence of the quasi-random samples to generate an output data sequence; and
        transmitting the output data sequence to another server.

12. The method of claim 11, comprising:
    segmenting the input data sequence into chunks; and
    shuffling and encrypting each of the chunks to determine an output data sequence for each chunk; and
    concatenating the output data sequences for the chunks to generate the output data sequence.

13. The method of claim 12, wherein a number of the chunks and a size of each chunk is determined based on a security parameter and an anonymity parameter.

14. The method of claim 13, wherein at least one of the security parameter and the anonymity parameter is determined based on a total number of desired permutations of the concatenated output data sequence.

15. The method of claim 12, comprising:
    shuffling and encrypting all the chunks to determine an output set of chunks prior to the shuffling and encrypting each of the chunks to determine the output data sequence for each chunk.

16. The method of claim 11, comprising:
    padding the n-dimensional space with padded values, wherein information describing locations for the padded values in the n-dimensional space is stored as part of a key to be used for de-shuffling and decrypting the output data sequence.

17. The method of claim 16, wherein the padding comprises increasing the n-dimensional space, wherein lengths of the dimensions are increased to a higher power of 2.

18. The method of claim 11, comprising:
de-shuffling and decrypting the output data sequence based on a key, wherein the key includes a value of n for the n-dimensional space and the de-shuffling and the decrypting comprises:
applying the quasi-random function to the output data sequence to determine the quasi-random samples;
populating the n-dimensional space with values from the output data sequence based on the quasi-random samples; and
linearizing the values in the n-dimensional space to determine the input data sequence.

19. The method of claim 18, wherein the populating of the n-dimensional space with the values from the output data sequence based on the quasi-random samples comprises:
determining if any of the values populated in the n-dimensional space from the shuffling and the encrypting are padded values based on information in the key describing locations of any padded values in then-dimensional space; and
if any of the values are padded values, skipping the samples corresponding to the padded values when performing the populating of the n-dimensional space during the de-shuffling and the decrypting.

20. A non-transitory computer readable medium including machine readable instructions that are executable by at least one processor to:
receive an input data sequence from a server;
determine an n-dimensional space wherein n>0;
populate the n-dimensional space with data from the input data sequence in a sequence order that the data appears in the input data sequence;
apply a quasi-random function to sample the data in the n-dimensional space to transform the data in the n-dimensional space into a sequence of quasi-random samples, wherein each quasi-random sample includes a coordinate corresponding to a position of the sampled data in the n-dimensional space;
use the coordinates included in the quasi-random samples as an index into the n-dimensional space to obtain the data from the n-dimensional space;
place the data obtained from the n-dimensional space in an order of the sequence of the quasi-random samples to generate an output data sequence; and
transmit the output data sequence to another server.

* * * * *